United States Patent
Murabayashi et al.

(10) Patent No.: US 8,555,937 B2
(45) Date of Patent: Oct. 15, 2013

(54) STRUCTURE FOR FUEL FILLING OPENING OF AUTOMOBILE

(75) Inventors: Shinya Murabayashi, Wako (JP); Yu Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 13/062,752

(22) PCT Filed: Sep. 11, 2009

(86) PCT No.: PCT/JP2009/065892
§ 371 (c)(1),
(2), (4) Date: Mar. 8, 2011

(87) PCT Pub. No.: WO2010/029989
PCT Pub. Date: Mar. 18, 2010

(65) Prior Publication Data
US 2011/0162754 A1    Jul. 7, 2011

(30) Foreign Application Priority Data
Sep. 11, 2008   (JP) .................. 2008-233567

(51) Int. Cl.
*B60K 15/04*   (2006.01)
*B65B 1/04*   (2006.01)
*B60K 15/03*   (2006.01)
*B60K 15/035*   (2006.01)

(52) U.S. Cl.
CPC ..................... *B60K 15/04* (2013.01)
USPC ........... 141/350; 141/312; 141/368; 220/86.2

(58) Field of Classification Search
USPC ......... 141/301, 302, 307, 310, 367, 331, 332, 141/339, 343, 348–350, 368, 370, 372, 386, 141/311 A; 220/86.2
See application file for complete search history.

(56) References Cited

U.S. PATENT DOCUMENTS

| | | | | |
|---|---|---|---|---|
| 5,186,220 | A * | 2/1993 | Scharrer | 141/59 |
| 5,195,566 | A * | 3/1993 | Ott et al. | 141/312 |
| 5,404,906 | A | 4/1995 | Aoshima et al. | |
| 5,730,194 | A * | 3/1998 | Foltz | 141/301 |
| 6,095,207 | A * | 8/2000 | Enders | 141/348 |
| RE37,776 | E | 7/2002 | Foltz | |
| 6,945,290 | B1 * | 9/2005 | Benjey et al. | 141/302 |
| 7,302,977 | B2 * | 12/2007 | King et al. | 141/367 |
| 7,360,565 | B2 * | 4/2008 | Peterson et al. | 141/326 |
| 7,640,954 | B2 * | 1/2010 | Bar | 141/350 |
| 7,967,042 | B2 * | 6/2011 | Groom et al. | 141/367 |
| 8,251,109 | B2 * | 8/2012 | Gebert et al. | 141/286 |
| 2008/0237230 | A1 | 10/2008 | Och | |
| 2011/0132906 | A1 * | 6/2011 | Miller et al. | 220/86.2 |
| 2012/0024422 | A1 * | 2/2012 | Cisternino | 141/349 |

FOREIGN PATENT DOCUMENTS

| | | |
|---|---|---|
| DE | 199 34 422 A1 | 2/2001 |
| JP | 06-50939 U | 7/1994 |
| JP | 2007-518619 A | 7/2007 |
| WO | WO 2005077698 A1 * | 8/2005 |

*Primary Examiner* — Timothy L Maust
*Assistant Examiner* — Robert Bell, III
(74) *Attorney, Agent, or Firm* — Carrier Blackman & Associates, P.C.; Joseph P. Carrier; Jeffrey T. Gedeon (57) ABSTRACT

A structure for a fuel filling opening of an automobile is configure such that, when fuel supplied from a fuel supply nozzle flows back to the fuel filling opening side, the fuel flowed back can be slowly discharged to the outside from the fuel filling opening. The structure is provided with ring recesses formed in a ring opening of an operation ring, and also with partitioning recesses formed in an opening in an outer tube partition. The recesses are arranged offset in the circumferential direction to form a labyrinth.

5 Claims, 11 Drawing Sheets

STRUCTURE FOR FUEL FILLING OPENING OF AUTOMOBILE

TECHNICAL FIELD

The present invention relates generally to an automobile fuel filler opening structure and, more particularly, to an automobile fuel filler opening structure wherein a shutter for opening/closing a filler pipe is provided and held in an open state by being pushed in by a fuel filler nozzle.

BACKGROUND ART

Among fuel filler opening structures of automobiles, there are those in which a shutter is provided in an openable and closeable manner in the vicinity of a fuel filler opening through which a fuel filler nozzle can be inserted, and an annular operating ring is provided above the shutter. With this fuel filler opening structure for an automobile, when the fuel filler nozzle has been inserted through the fuel filler opening, the operating ring is enlarged in diameter by the inserted nozzle, and a lock on the shutter is released in conjunction with the enlarging of the operating ring.

With the lock on the shutter released, the fuel filler nozzle is inserted toward the shutter, whereby the shutter is pushed down and opened by the nozzle. There is a known technique whereby the fuel filler nozzle is inserted up to a fuel filling position while the shutter is in an opened state and fuel is supplied from the inserted nozzle to a fuel tank, as is disclosed in Patent Document 1, for example.

However, with the fuel filler opening structure of Patent Document 1, fuel could mistakenly be supplied from the fuel filler nozzle in a state in which the shutter has not been opened by the fuel filler nozzle. In this case, there is a danger that fuel supplied from the fuel filler nozzle will flow (backward) to the fuel filler opening, and the back-flowing fuel will strongly discharge to the outside from the fuel filler opening and come in contact with the user.

The fuel filler nozzle is commonly provided with a liquid level detection sensor in the distal end in the nozzle. When the liquid level of the fuel has risen to the liquid level detection sensor while the fuel is being supplied by the fuel filler nozzle, the liquid level of the fuel is detected by the liquid level detection sensor. When the liquid level of the fuel is detected by the liquid level detection sensor, the supply of fuel is stopped based on a detection signal of the sensor.

However, if the detection sensor fails, it becomes impossible for the liquid level of the fuel to be detected by the detection sensor and for the supply of fuel to be stopped. Therefore, the fuel supplied from the fuel filler nozzle flows back toward the fuel filler opening, the back-flowing fuel strongly discharges to the outside from the fuel filler opening, and the discharged fuel comes in contact with the user.

PRIOR ART LITERATURE

Patent Document

Patent Document 1: JP 2007-518619 A

SUMMARY OF INVENTION

Technical Problem

An object of the present invention is to provide a fuel filler opening structure for an automobile whereby back-flowing fuel is slowly discharged to the outside through a fuel filler opening, and the discharged fuel is prevented from coming in contact with the user when fuel supplied from a fuel filler nozzle flows back to the fuel filler opening.

Solution to Problem

According to one aspect of the present invention, there is provided an automobile fuel filler opening structure comprising: a filler pipe having a fuel filler opening that allows insertion of a fuel filler nozzle therethrough; and a shutter for opening/closing the filler pipe, the shutter being adapted to be held in an opened state by pushing in the fuel filler nozzle so as to allow insertion of the fuel filler nozzle up to a fuel filling position, wherein the structure further comprises first and second partitioning parts provided at a predetermined interval between the shutter and the fuel filler opening for allowing passage of the fuel filler nozzle therethrough, the first partitioning part having a first opening for allowing passage of the fuel filler nozzle, the second partitioning part having a second opening for allowing passage of the fuel filler nozzle, the first opening having at least one first hollow part of a predetermined circumferential width, the second opening having at least one second hollow part of a predetermined circumferential width, the first and second hollow parts being provided in a circumferentially offset relation to each other to thereby form a labyrinth between the shutter and the fuel filler opening.

Preferably, the first partitioning part comprises an operating ring whereby the locking of the shutter is released by the first opening enlarging when the fuel filler nozzle is inserted into the first opening.

According to another aspect of the present invention, there is provided an automobile fuel filler opening structure comprising: a filler pipe having a fuel filler opening that allows insertion of a fuel filler nozzle therethrough; and a shutter for opening/closing the filler pipe, the shutter being adapted to be held in an opened state by pushing in the fuel filler nozzle so as to allow insertion of the fuel filler nozzle up to a fuel filling position, wherein the structure further comprises a partitioning part provided between the shutter and the fuel filler opening for allowing passage of the fuel filler nozzle, the partitioning part has an opening for allowing passage of the fuel filler nozzle, and the opening has chamfered parts in corners thereof so that a rate of fuel flowing from the shutter to the fuel filler opening via gaps between the opening and the fuel filler nozzle is minimized.

Preferably, the chamfered parts are formed in an internal peripheral edge of the opening.

In a preferred form, the chamfered parts comprise inclined surfaces.

The chamfered parts may be convex curved surfaces.

Advantageous Effects of Invention

In one aspect, the inventive arrangement has first and second partitioning parts through which a fuel filler nozzle can be inserted, and these first and second partitioning parts are provided at a predetermined interval from each other between the shutter and the fuel filler opening. Furthermore, a first opening is formed in the first partitioning part, and at least one first hollow part having a predetermined width in the circumferential direction is formed in the first opening. Furthermore, a second opening is formed in the second partitioning part, and at least one second hollow part having a predetermined width in the circumferential direction is formed in the second opening. The first and second hollow parts are disposed at an offset in the circumferential direction, forming a labyrinth between the shutter and the fuel filler opening. Accordingly, in cases in which fuel supplied from the fuel filler nozzle flows (backward) from the shutter to the fuel filler opening, the flow rate of the back-flowing fuel can be minimized by the labyrinth. The back-flowing fuel can thereby be slowly discharged to the outside from the fuel filler opening, and the discharged fuel can be prevented from coming in contact with the user.

The first partitioning part is configured from an operating ring. The operating ring is an existing member for releasing the locking of the shutter when the fuel filler nozzle is inserted into the first opening. Thus, by using an existing operating ring as the first partitioning part, the configuration can be simplified because there is no need to provide a new member as the first partitioning part.

In the inventive arrangement in another aspect, a partitioning part is provided through which the fuel filler nozzle can be inserted, and chamfered parts are formed in corners of the opening in this partitioning part. Accordingly, it is possible to minimize the flow rate of fuel flowing (backward) from the shutter to the fuel filler opening via the gaps between the opening of the partitioning part and the fuel filler nozzle. Back-flowing fuel can thereby be more slowly discharged to the outside from the fuel filler opening, and the discharged fuel can be prevented from coming in contact with the user.

The chamfered parts are formed in the internal peripheral edge of the opening and are comprised of inclined surfaces or convex curved surfaces. Therefore, it is possible to minimize the flow rate of fuel flowing between the internal peripheral edge and the fuel filler nozzle.

BRIEF DESCRIPTION OF DRAWINGS

A preferred embodiment of the present invention will be described in detail below, by way of example only, with reference to the accompanying drawings, in which:

FIGS. 8A-8B are views showing a manner in which fuel flows when the fuel filler nozzle has been inserted up to the second shutter of the fuel filler opening structure; wherein

FIGS. 9A-9B are views showing a state in which fuel slowly overflows from the fuel opening, wherein

FIGS. 10A-10B are views showing a state in which the fuel filler nozzle has been inserted up to the fuel filling position of the fuel filler opening structure, wherein

FIGS. 11A-11B are views showing a state in which fuel slowly overflows from the fuel filler opening of the fuel filler opening structure, wherein

DESCRIPTION OF EMBODIMENTS

Figure 1:
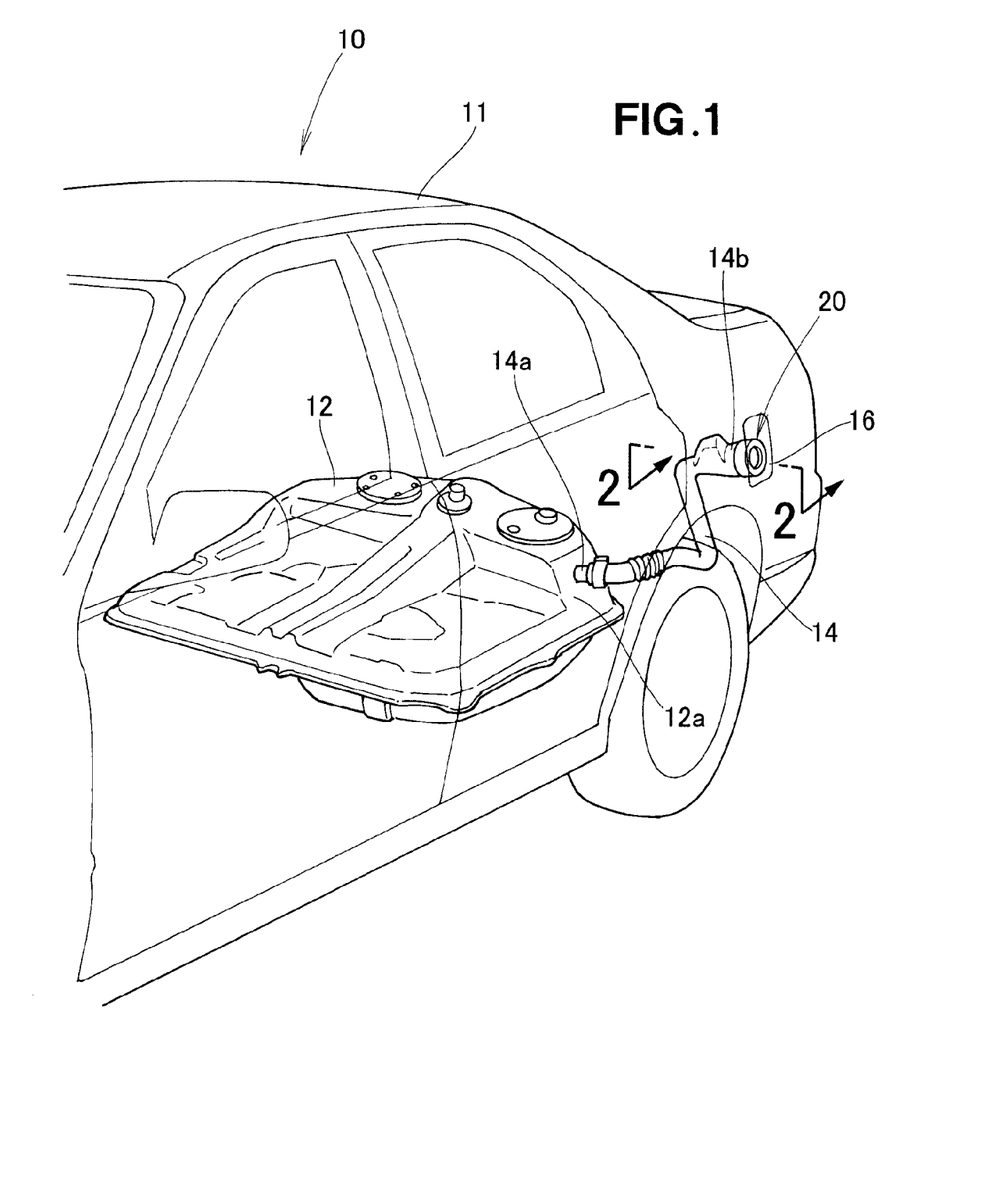
FIG. 1 is a perspective view of an automobile provided with the fuel filler opening structure for an automobile according to the present invention.

In an automobile 10 shown in FIG. 1, a fuel tank 12 is provided underneath the floor of a vehicle frame 11, a pipe proximal end 14*a* of a filler pipe 14 is provided to the left rear part 12*a* of the fuel tank 12, a fuel filler opening structure 20 for an automobile is provided to a pipe head 14*b* of the filler pipe 14, and a fuel lid 16 for covering the fuel filler opening structure 20 for an automobile is attached to the vehicle frame 11 in an openable and closeable manner.

The fuel filler opening structure 20 for an automobile is configured so that a fuel filler nozzle 23 (FIG. 7) of a fuel filler gun 22 provided at a fuelling station can be inserted, and the inserted fuel filler nozzle 23 can be guided into the filler pipe 14. The fuel filler opening structure 20 for an automobile is described hereinbelow.

Figure 2:
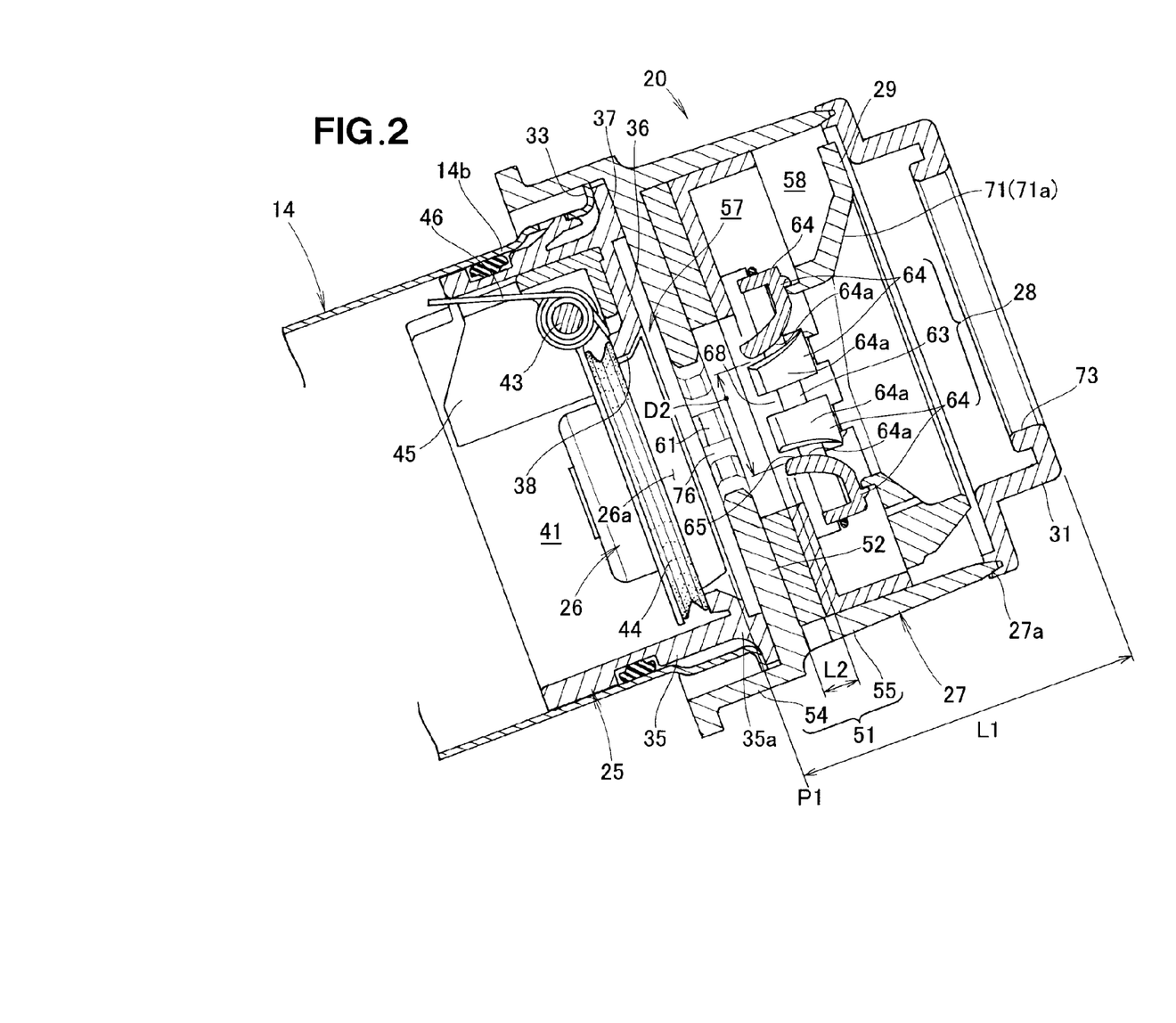
FIG. 2 is an enlarged cross-sectional view taken along line 2-2 of FIG. 1.
Figure 3:
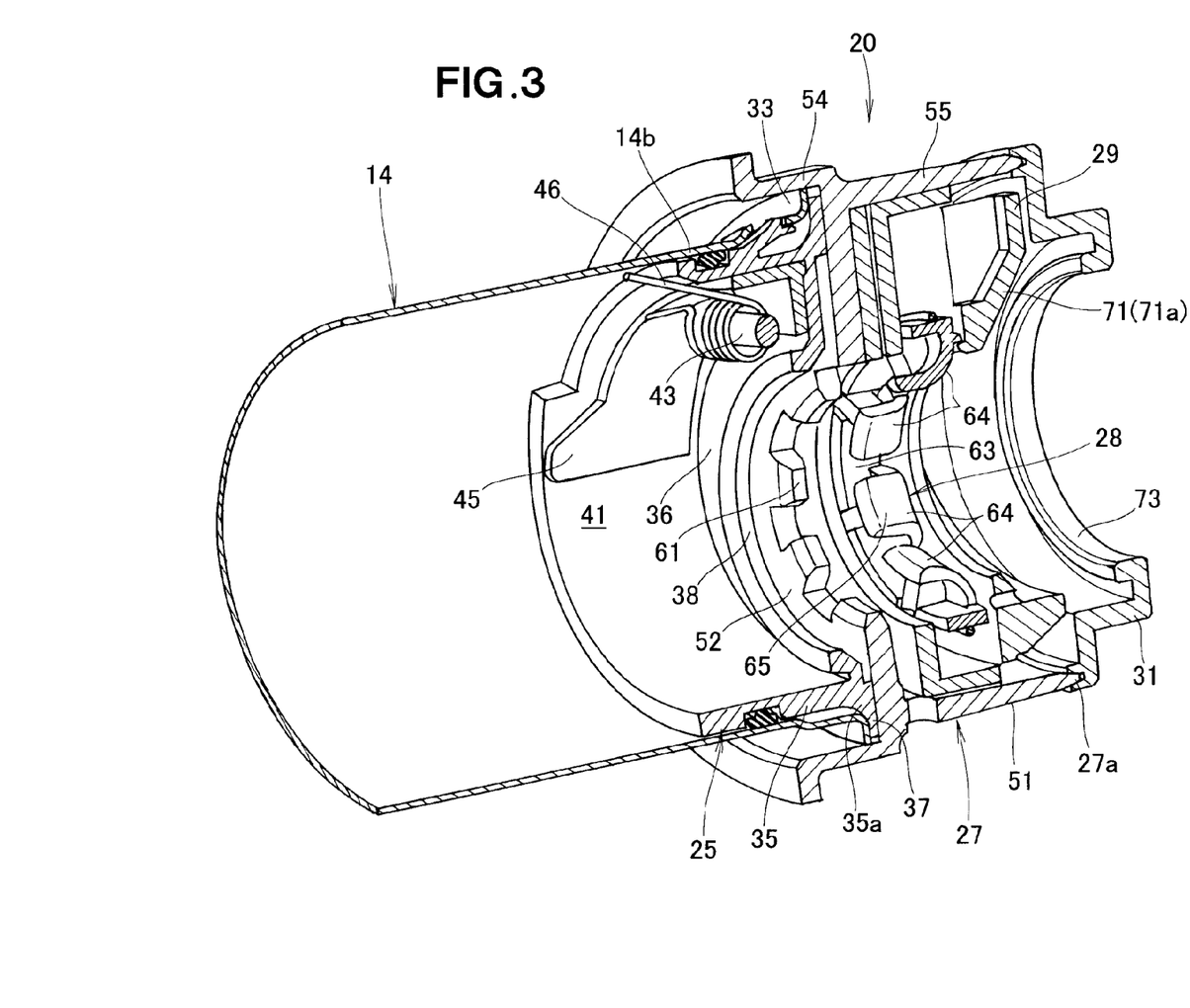
FIG. 3 is a perspective view of the fuel filler opening structure of FIG. 2.

The fuel filler opening structure 20 for an automobile has an inside cylinder 25 provided in the pipe head 14*b* of the filler pipe 14, an outside cylinder 27 provided to the inside cylinder 25, an operating ring (first partitioning part) 28 and a nozzle guide 29 provided in the outside cylinder 27, and a fuel filler opening ring 31 provided to an outside cylinder head 27*a* of the outside cylinder 27, as shown in FIGS. 2 and 3.

A fuel filler opening 73 of the fuel filler opening ring 31 is provided with a fuel filler opening shutter (not shown) which serves as a first shutter. A pipe shutter (a shutter) 26 which serves as a second shutter is provided in the inside cylinder 25.

The fuel filler opening structure 20 for an automobile has a so-called capless type of fuel filler opening structure in which the inclusion of the fuel filler opening shutter and the pipe shutter 26 allows the fuel filler opening cap to be removed from the fuel filler opening 73.

In the filler pipe 14, the pipe proximal end 14*a* is provided to the left rear part 12*a* of the fuel tank 12 as shown in FIG. 1, and a pipe flange 33 (FIG. 3) is formed in the pipe head 14*b*. The inside cylinder 25 is inserted into the opening of the pipe head 14*b*.

The inside cylinder 25 has a cylindrical inside cylinder wall 35 coaxially inserted into the opening of the pipe head 14*b*, and an inside cylinder partitioning wall 36 and an inside cylinder flange 37 formed at the end 35*a* of the inside cylinder wall 35.

The inside cylinder wall 35 of the inside cylinder 25 is inserted into the opening of the pipe head 14*b*, and the inside cylinder flange 37 is brought into contact with the pipe flange 33. An inside cylinder partitioning opening 38 through which the fuel filler nozzle 23 shown in FIG. 7 can be inserted is formed in the inside cylinder partitioning wall 36. The pipe shutter 26 is provided to an inside cylinder internal space 41 of the inside cylinder 25.

The pipe shutter 26 is provided in an openable and closeable manner across a predetermined gap L1 (FIG. 2) toward the filler pipe 14 away from the fuel filler opening 73, described hereinafter. This pipe shutter 26 is supported to be capable of swinging about a support pin 43 between a closed position P1 and an open position P2 (FIG. 7), and an annular seal member 44 is provided to an external periphery 26a. The support pin 43 is provided to a support member 45. The support member 45 is provided to the inside cylinder wall 35 in a state of being disposed in the inside cylinder internal space 41 of the inside cylinder 25.

The pipe shutter 26 is held in the closed position P1 by the urging force of a return coil spring 46, and is locked in the closed position P1 by a lock mechanism (not shown). The coil spring 46 is provided to the support pin 43. The lock mechanism is configured so that the lock is released when the operating ring 28 enlarges in diameter.

The pipe shutter 26 is held in the closed position P1 by the urging force of the coil spring 46. The pipe shutter 26 is locked in this state by the lock mechanism. The annular seal member 44 comes in contact with the peripheral edge of the inside cylinder partitioning opening 38 due to the pipe shutter 26 being held in the closed position P1. The inside cylinder partitioning opening 38 is thereby closed off by the pipe shutter 26.

While the lock of the lock mechanism is in a released state, the pipe shutter 26 is capable of swinging to the open position P2 against the urging force of the coil spring 46. The inside cylinder partitioning opening 38 is opened by the swinging of the pipe shutter 26 to the open position P2.

The outside cylinder 27 has a cylindrical outside cylinder wall 51 provided along the same axis as the inside cylinder 25, and an outside cylinder partitioning wall (second partitioning part) 52 formed in the outside cylinder wall 51.

The outside cylinder wall 51 has a fitting peripheral wall 54 enlarged in diameter to be capable of fitting into the inside cylinder flange 37 of the inside cylinder 25 and the pipe flange 33, and an accommodating peripheral wall 55 formed integrally in the fitting peripheral wall 54 and capable of accommodating the operating ring 28. The outside cylinder 27 is provided along the same axis as the inside cylinder 25 in a state in which the inside cylinder flange 37 and the pipe flange 33 are fitted into the fitting peripheral wall 54.

The outside cylinder partitioning wall 52 is provided between the pipe shutter 26 and the fuel filler opening 73, i.e., between the pipe shutter 26 and the operating ring 28. The outside cylinder partitioning wall 52 is a partitioning wall for partitioning a fitting internal space 57 in the fitting peripheral wall 54 and an accommodating internal space 58 in the accommodating peripheral wall 55, and an outside cylinder partitioning opening (a second opening, an opening) 61 is formed along the same axis as the outside cylinder wall 51. The outside cylinder partitioning opening 61 of the outside cylinder partitioning wall 52 is described in detail in FIGS. 4 and 5.

The operating ring 28 is provided between the outside cylinder partitioning wall 52 and the fuel filler opening 73, i.e., between the outside cylinder partitioning wall 52 and the fuel filler opening 73. Specifically, the operating ring 28 is provided in the accommodating internal space 58 along the same axis as the outside cylinder partitioning opening 61, and is also provided at a predetermined gap L2 from the outside cylinder partitioning wall 52 in the direction in which the fuel filler nozzle 23 is inserted and removed.

The operating ring 28 has an annular ring main body 63 provided along the same axis as the outside cylinder partitioning opening 61, and a plurality of insertion guides 64 provided at constant intervals in the circumferential direction of the ring main body 63. Each of the insertion guides 64 is a member formed from an elastic and deformable resinous material, and each has a guide piece 64a provided in a shape curving toward the internal peripheral wall of the ring main body 63.

By providing the insertion guides 64 to the ring main body 63 at constant intervals, a ring opening (first opening) 65 is formed by the guide pieces 64a. The ring opening 65 is formed with a hole diameter D2 smaller than the outside diameter D1 (FIG. 7) of the fuel filler nozzle 23, allowing the fuel filler nozzle 23 to be inserted (made insertable).

The fuel filler nozzle 23 (see FIG. 7) is inserted into the ring opening 65 of the operating ring 28, whereby the guide pieces 64a are elastically deformed outward in the radial direction by the fuel filler nozzle 23. Accordingly, the hole diameter D2 of the ring opening 65 is enlarged to the same dimension as the outside diameter D1 of the fuel filler nozzle 23.

The locked state of the lock mechanism (not shown) of the pipe shutter 26 is released by the elastic deformation of the guide pieces 64a in the direction in which the diameter is increased. The ring opening 65 of the operating ring 28 is described in detail in FIGS. 4 and 5.

In the accommodating internal space 58 of the accommodating peripheral wall 55, the nozzle guide 29 is provided adjacent to, and along the same axis as, the operating ring 28. The nozzle guide 29 is formed into a substantially cylindrical shape, and is a member whereby a peripheral wall 71 (particularly a top wall 71a) guides the fuel filler nozzle 23 (FIG. 7) into the ring opening 65 of the operating ring 28. The fuel filler nozzle 23 can be easily inserted into the ring opening 65 by the fuel filler nozzle 23 being guided into the ring opening 65 by the nozzle guide 29.

Figure 7:
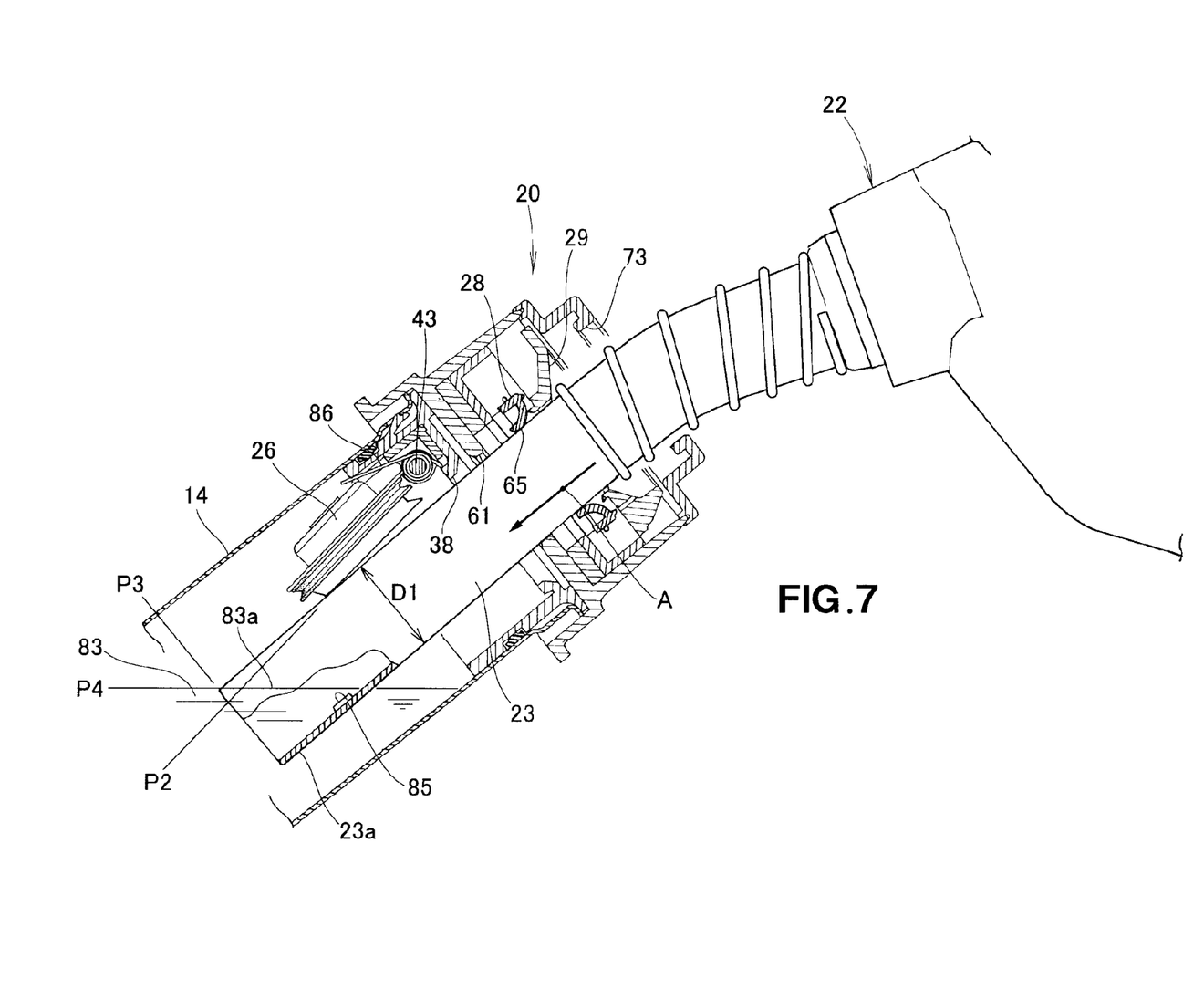
FIG. 7 is a view showing a state in which the fuel filler nozzle has been inserted up to the fuel filling position in the fuel filler opening structure of FIG. 2.

The fuel filler opening ring 31 is a member having a fuel filler opening 73 into which the fuel filler nozzle 23 can be inserted, and is provided to the outside cylinder head 27a of the outside cylinder 27. The fuel filler opening 73 is the opening into which the fuel filler nozzle 23 shown in FIG. 7 is inserted.

The fuel filler opening shutter (not shown) is provided in an openable and closeable manner to the fuel filler opening ring 31. The fuel filler opening shutter is configured so as to be pushed open by a distal end 23a (FIG. 7) of the fuel filler nozzle 23 inserted through the fuel filler opening 73, and to be held in the closed position by the spring force of a return spring (not shown) when the fuel filler nozzle 23 has been removed from the fuel filler opening 73.

Figure 4:
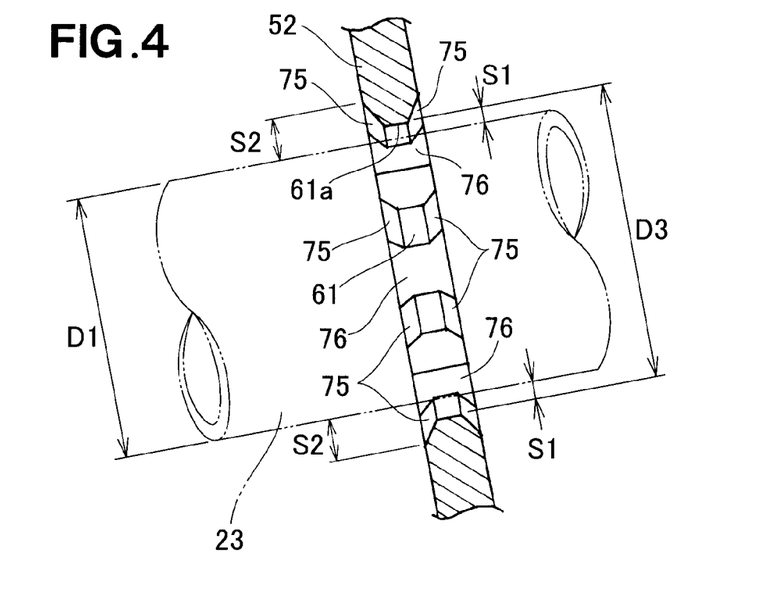
FIG. 4 is a cross-sectional view showing the outside cylinder partitioning opening of the outside cylinder partitioning wall of FIG. 2.
Figure 5:
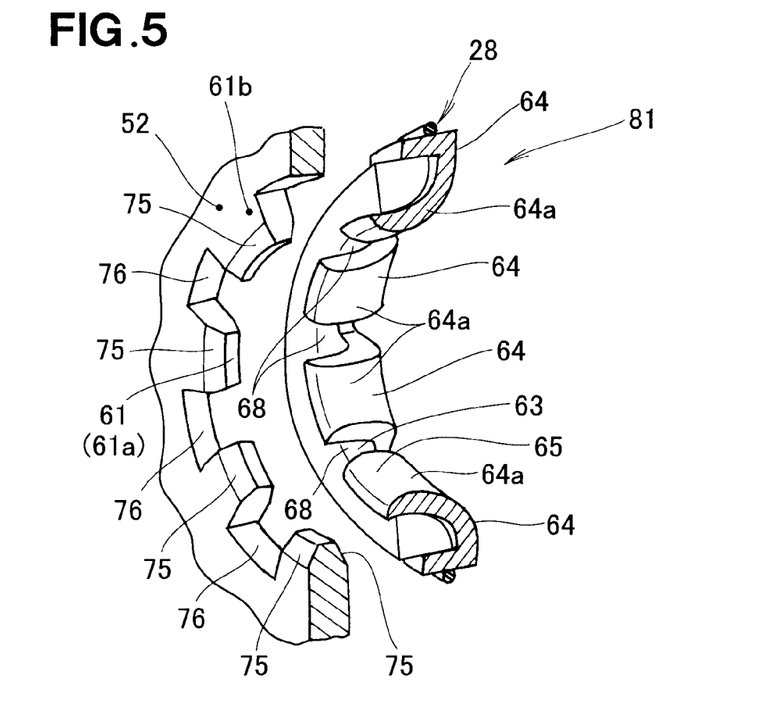
FIG. 5 is a perspective view in which a labyrinth is formed by the outside cylinder partitioning opening of the outside cylinder partitioning wall and the ring opening of the operating ring of FIG. 3.

The outside cylinder partitioning opening 61 is formed having a hole diameter D3 slightly larger than the outside diameter D1 of the fuel filler nozzle 23, as shown in FIGS. 4 and 5. Specifically, the outside cylinder partitioning opening 61 is formed to allow the fuel filler nozzle 23 to be inserted through (to be insertable). Furthermore, the outside cylinder partitioning opening 61 is formed so that the space between an internal peripheral edge 61a of the outside cylinder partitioning opening 61 and the fuel filler nozzle 23 (the space between the opening and the fuel filler nozzle) is S1.

The outside cylinder partitioning opening 61 has inclined surfaces (chamfered parts) 75 formed in each pair of corners of the internal peripheral edge 61a. Accordingly, the spaces S2 between the inclined surfaces 75 and the fuel filler nozzle 23 are formed larger than the spaces S1 between the internal peripheral edge 61a and the fuel filler nozzle 23. The flow rate of fuel flowing between the internal peripheral edge 61a and the fuel filler nozzle 23 can thereby be minimized. By forming the spaces S2 larger than the spaces S1, the fuel filler nozzle 23 can be smoothly guided during insertion.

Furthermore, in the outside cylinder partitioning opening 61, a plurality of partitioning concavities (second hollow parts) 76 having predetermined widths are formed at predetermined intervals in the circumferential direction of internal peripheral parts 61b. The reasons for forming the partitioning concavities 76 in the outside cylinder partitioning opening 61 are described hereinafter.

The operating ring 28 is provided with a plurality of insertion guides 64 at constant intervals in the circumferential direction of the ring main body 63, as shown in FIG. 5, whereby a plurality of ring concavities (first hollow parts) 68 is formed by the guide pieces 64a and the ring main body 63. In other words, in the ring opening 65, a plurality of ring concavities 68 having predetermined widths is formed at predetermined intervals in the circumferential direction.

The ring concavities 68 are disposed at an offset (in different positions) in the circumferential direction from the partitioning concavities 76 of the outside cylinder partitioning opening 61. By disposing the ring concavities 68 at an offset (in different positions) in the circumferential direction from the partitioning concavities 76, a labyrinth 81 is formed by the ring concavities 68 and the partitioning concavities 76. The flow rate of fuel flowing from the pipe shutter 26 shown in FIG. 2 toward the fuel filler opening 73 can thereby be minimized by the labyrinth 81 formed by the ring concavities 68 and the partitioning concavities 76. The width dimensions of the ring concavities 68 and the width dimensions of the partitioning concavities 76 do not need to be equal to each other and can be set arbitrarily.

The operating ring 28 is an existing member used in common fuel filler opening structures. Thus, by using an existing operating ring 28 and forming the labyrinth 81, there is no need to provide new members. It is thereby possible to form a labyrinth 81 for minimizing the fuel flow rate with a simple configuration, and the configuration can be simplified.

Next, an example in which fuel 83 is supplied from the fuel filler opening structure 20 for an automobile will be described based on FIGS. 6 and 7.

Figure 6:
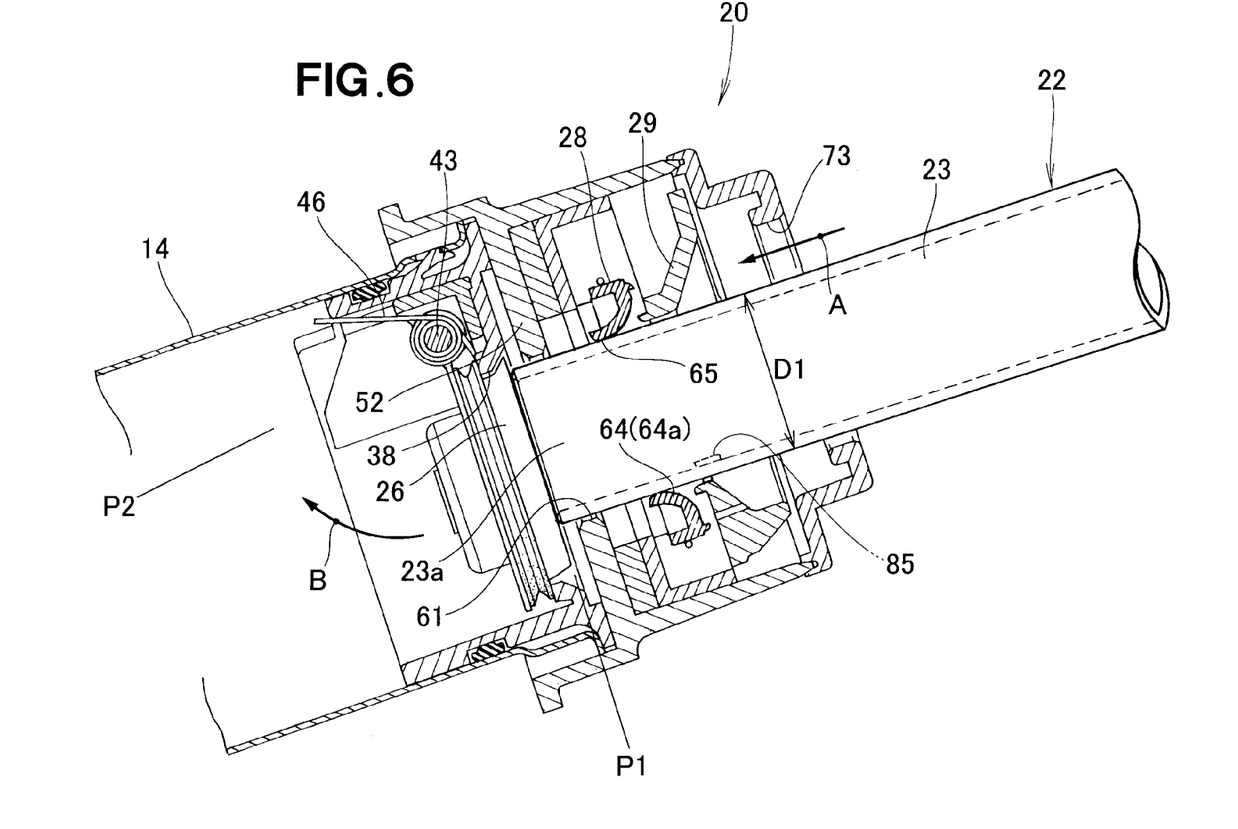
FIG. 6 is a view showing a state in which the fuel filler nozzle has been inserted partway into the fuel filler opening structure shown in FIG. 2.

The fuel filler nozzle 23 of the fuel filler gun 22 is inserted as shown by arrow A through the fuel filler opening 73, as shown in FIG. 6. The distal end 23a of the fuel filler nozzle 23 is inserted into the ring opening 65 of the operating ring 28 via the fuel filler opening 73 and the nozzle guide 29.

By insertion of the distal end 23a of the fuel filler nozzle 23 into the ring opening 65, each of the guide pieces 64a of the insertion guides 64 is elastically deformed by the fuel filler nozzle 23 in an outward radial direction. Accordingly, the hole diameter D2 (FIG. 2) of the ring opening 65 is enlarged to the same dimension as the outside diameter D1 of the fuel filler nozzle 23.

The lock of the lock mechanism (not shown) of the pipe shutter 26 is released by the elastic deformation of the guide pieces 64a in the direction in which the diameter is increased. In this state, the fuel filler nozzle 23 continues to be inserted as shown by arrow A, whereby the distal end 23a of the fuel filler nozzle 23 comes in contact with the pipe shutter 26 via the outside cylinder partitioning opening 61.

The pipe shutter 26 is pushed in by the distal end 23a of the fuel filler nozzle 23. The pipe shutter 26 is swung from the closed position P1 to the open position P2, as shown by arrow B, against the urging force of the coil spring 46.

The pipe shutter 26 is opened to the open position P2 by the pipe shutter 26 being pushed in by the fuel filler nozzle 23, as shown in FIG. 7. Accordingly, the fuel filler nozzle 23 can be inserted into a fuel filling position P3 as shown by arrow A. With the fuel filler nozzle 23 having been inserted into the fuel filling position P3, the fuel filler gun 22 is operated and fuel 83 is supplied from the distal end 23a of the fuel filler nozzle 23 to the filler pipe 14.

Fuel 83 is supplied to the fuel tank 12, and the fuel 83 rises to a FULL position (full tank position) P4 of the filler pipe 14. The liquid level 83a of the fuel 83 reaches a fuel detection sensor 85 provided to the distal end 23a of the fuel filler nozzle 23. The fuel detection sensor 85 detects the fuel 83, and the supply of fuel 83 is stopped based on a detection signal of the fuel detection sensor 85.

Next, an example is described with reference to FIGS. 8A-8B and 9A-9B in which fuel 83 is supplied without inserting the fuel filler nozzle 23 of the fuel filler gun 22 up to the fuel filling position P3.

Figure 8A:
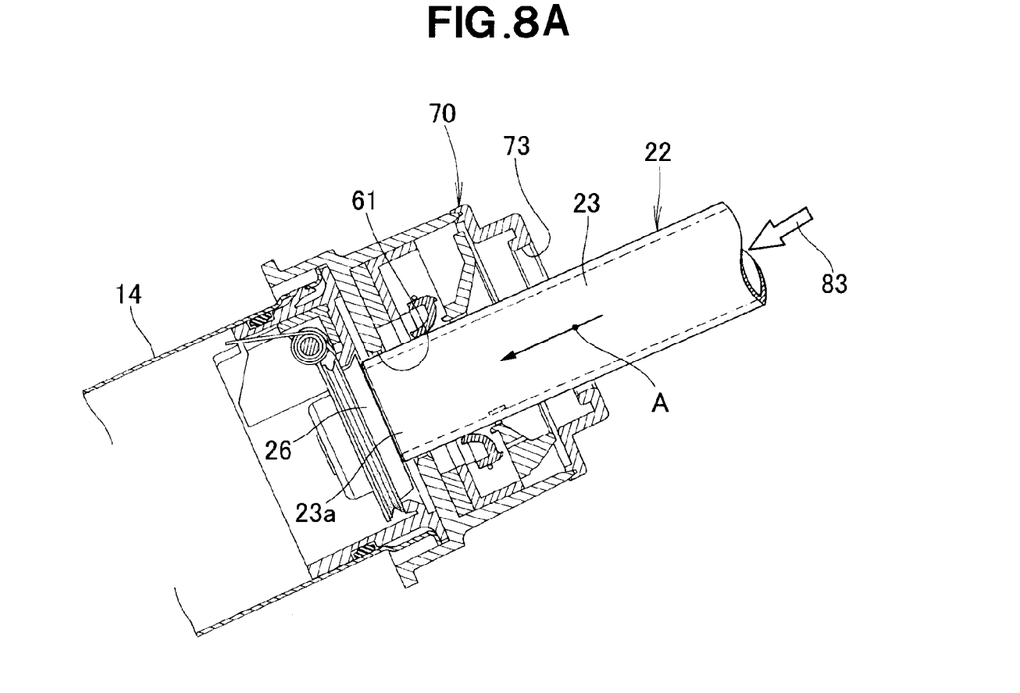
FIG. 8A is a view showing the fuel filler nozzle of a fuel filler gun inserted through the fuel filler opening.

In FIG. 8A, the fuel filler nozzle 23 of the fuel filler gun 22 is inserted through the fuel filler opening 73 as shown by arrow A. The distal end 23a of the fuel filler nozzle 23 reaches the pipe shutter 26 via the outside cylinder partitioning opening 61. In this state, the user mistakenly attempts to supply fuel 83 from the fuel filler nozzle 23 of the fuel filler gun 22 to the filler pipe 14.

Figure 8B:
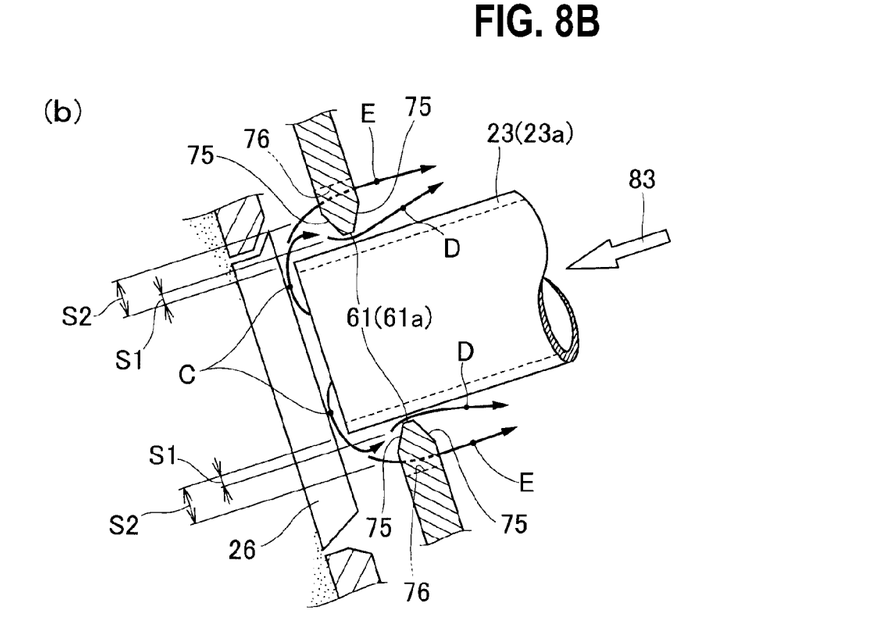
FIG. 8B is a view showing the fuel supplied from a distal end of the fuel filler nozzle coming in contact with a pipe shutter.

In FIG. 8B, the fuel 83 supplied from the distal end 23a of the fuel filler nozzle 23 comes in contact with the pipe shutter 26 and flows back to the outside cylinder partitioning opening 61 as shown by arrows C. The outside cylinder partitioning opening 61 has spaces S1 formed between the internal peripheral edge 61a and the fuel filler nozzle 23. Accordingly, part of the fuel 83 in the fuel 83 flowing back as shown by arrows C flows as shown by arrows D through the spaces S1 between the internal peripheral edge 61a and the fuel filler nozzle 23. The remaining fuel 83 is described in detail in FIG. 9A.

The inclined surfaces (chamfered parts) 75 are formed in the internal peripheral edge 61a of the outside cylinder partitioning opening 61. Accordingly, large spaces S2 are ensured between the inclined surfaces 75 and the fuel filler nozzle 23. The flow rate of the back-flowing fuel 83 can be minimized when the fuel 83 flowing back as shown by arrows C flows between the internal peripheral edge 61a and the fuel filler nozzle 23 as shown by arrows D.

Figure 9A:
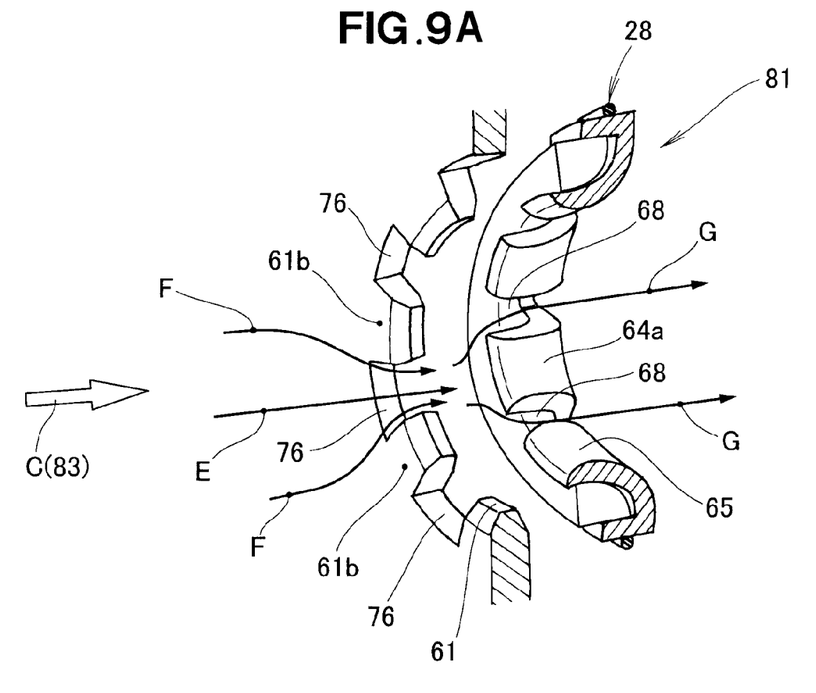
FIG. 9A is a view of fuel overflow from the fuel opening in which the fuel filler nozzle is omitted.
Figure 9B:
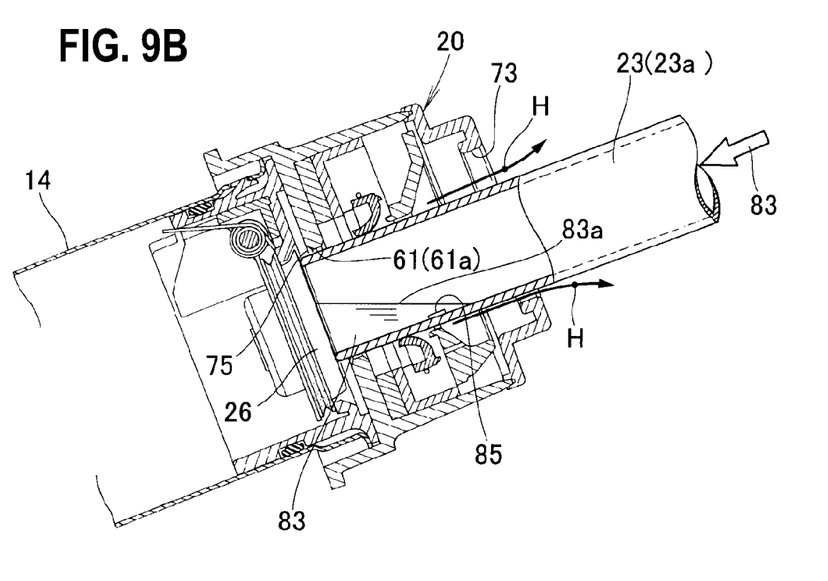
FIG. 9B is a view showing inclined surfaces formed in an internal peripheral edge of the outside cylinder partitioning opening.

FIGS. 9A and 9B show a state in which fuel slowly overflows from the fuel filler opening. The fuel filler nozzle 23 is omitted from FIG. 9A in order to make it easier to understand the flow rate of the fuel 83.

In FIG. 9A, the outside cylinder partitioning opening 61 has a plurality of partitioning concavities 76 formed in the internal peripheral parts 61b. Accordingly, the remaining fuel 83 in the fuel 83 flowing back as shown by arrows C flows as shown by arrow E through the partitioning concavities 76.

Some of the remaining fuel 83 is blocked from flowing through by the internal peripheral parts 61b. Accordingly, some of the remaining fuel 83 circumvents the internal peripheral parts 61b and flows to the partitioning concavities 76 as shown by arrows F. The flow rate can thereby be minimized when the remaining fuel 83 flows through the partitioning concavities 76 as shown by arrows E and F.

A plurality of ring concavities 68 is formed in the ring opening 65 of the operating ring 28. By disposing the ring concavities 68 at an offset (in different positions) in the circumferential direction from the plurality of partitioning concavities 76, a labyrinth 81 is formed by the ring concavities 68 and the partitioning concavities 76. Accordingly, the flow of fuel 83 through the partitioning concavities 76 as shown by arrows E and F is blocked by the guide pieces 64a of the insertion guides 64. The fuel 83 flowing as shown by arrows E and F thereby circumvents the guide pieces 64a and flows into the ring concavities 68 as shown by arrows G. Therefore, the flow rate of the fuel 83 flowing as shown by arrows E and F via the ring concavities 68 can be minimized as shown by arrows G. Thus, by forming a labyrinth 81 from the ring concavities 68 and the partitioning concavities 76, the flow rate can be minimized in the remaining fuel 83, which is part of the fuel 83 flowing back as shown by arrows C.

In FIG. 9B, inclined surfaces (chamfered parts) 75 are formed in the internal peripheral edge 61a of the outside cylinder partitioning opening 61, and the labyrinth 81 (FIG. 9A) is formed by the ring concavities 68 and the partitioning concavities 76, whereby the flow rate of fuel 83 flowing back against the pipe shutter 26 can be minimized. Accordingly, the back-flowing fuel 83 can be slowly discharged through the fuel filler opening 73 as shown by arrows H to the outside of the fuel filler opening structure 20 for an automobile. The discharged fuel 83 can thereby be prevented from coming in contact with the user.

Additionally, fuel 83 can be stored in the distal end 23a of the fuel filler nozzle 23 by the back-flowing fuel 83 being smoothly discharged to the outside from the fuel filler opening 73. Accordingly, the liquid level 83a of the stored fuel 83 reaches the fuel detection sensor 85. The fuel detection sensor 85 detects the fuel 83, and the supply of fuel 83 can be stopped based on a detection signal of the fuel detection sensor 85.

Figure 10A:
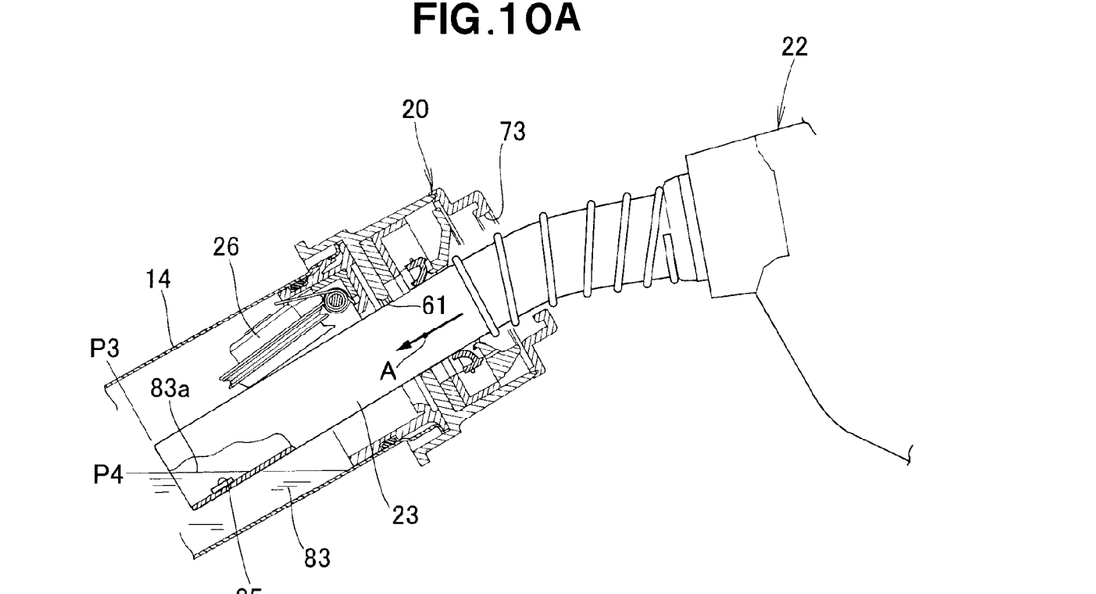
FIG. 10A is a view showing the fuel filler nozzle of the fuel filler gun being inserted through the fuel filler opening.
Figure 10B:
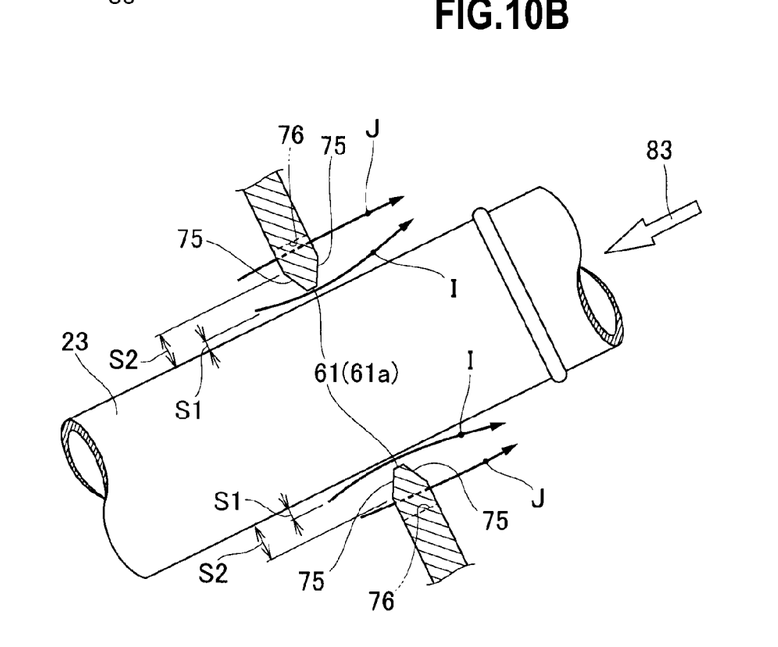
FIG. 10B is a view showing an outside cylinder partitioning opening having spaces formed between an internal peripheral edge and the fuel filler nozzle.

Next, an example in which a failure occurs in the fuel detection sensor 85 of the fuel filler gun 22 will be described based on FIGS. 10A-10B and 11A-11B. FIGS. 10A and 10B show a state in which the fuel filler nozzle 23 has been inserted up to the fuel filling position.

In FIG. 10A, the fuel filler nozzle 23 of the fuel filler gun 22 is inserted through the fuel filler opening 73 as shown by arrow A. The pipe shutter 26 is pushed in and opened to the open position P2 by the fuel filler nozzle 23, and the fuel filler nozzle 23 is inserted up to the fuel filling position P3. In this state, the fuel 83 is supplied from the fuel filler nozzle 23 of the fuel filler gun 22 to the filler pipe 14.

The fuel 83 is supplied to the fuel tank 12 shown in FIG. 1, and the fuel 83 rises up to the FULL position (full tank position) P4 of the filler pipe 14. The liquid level 83a of the fuel 83 reaches the fuel detection sensor 85 of the fuel filler nozzle 23. When such a state has occurred, a failure will possibly occur in the fuel detection sensor 85.

When a failure has occurred in the fuel detection sensor 85, the fuel 83 is supplied past the FULL position (full tank position) P4. At this time, the supplied fuel 83 overflows from the filler pipe 14 and flows back to the outside cylinder partitioning opening 61.

In FIG. 10B, the outside cylinder partitioning opening 61 has spaces S1 10 formed between the internal peripheral edge 61a and the fuel filler nozzle 23. Accordingly, some of the fuel 83 in the back-flowing fuel 83 flows as shown by arrows I through the spaces S1 between the internal peripheral edge 61a and the fuel filler nozzle 23. The remaining fuel 83 is described in detail in FIG. 11A.

Inclined surfaces (chamfered parts) 75 are formed in the internal peripheral edge 61a of the outside cylinder partitioning opening 61. Accordingly, large spaces S2 are ensured between the inclined surfaces 75 and the fuel filler nozzle 23. When fuel 83 flowing back from the filler pipe 14 (FIG. 10A) flows as shown by arrows I between the internal peripheral edge 61a and the fuel filler nozzle 23, the flow rate of the back-flowing fuel 83 can thereby be minimized.

Figure 11A:
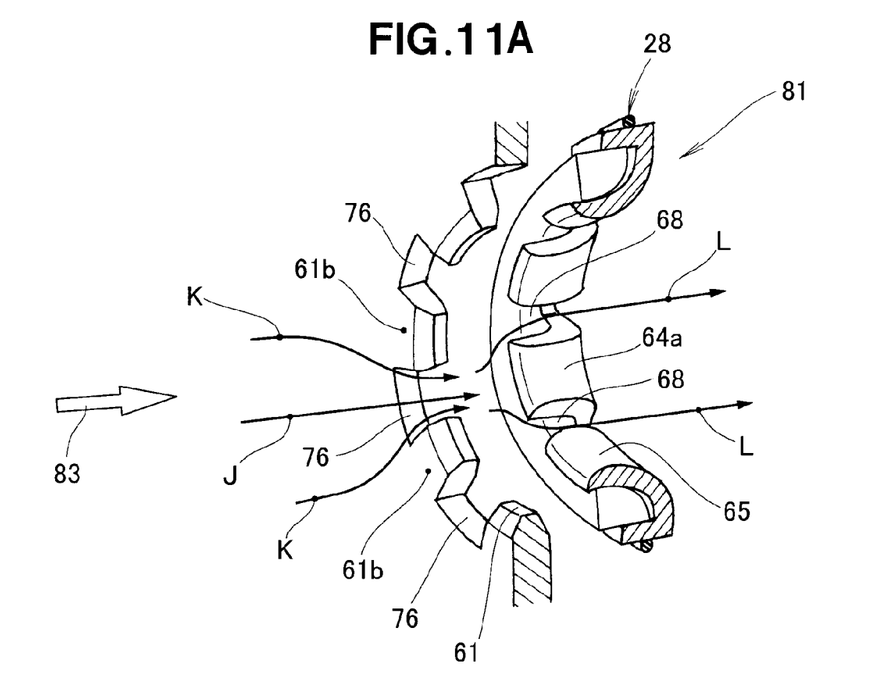
FIG. 11A is a view showing an outside cylinder partitioning opening having a plurality of partitioning concavities formed in internal peripheral parts thereof.
Figure 11B:
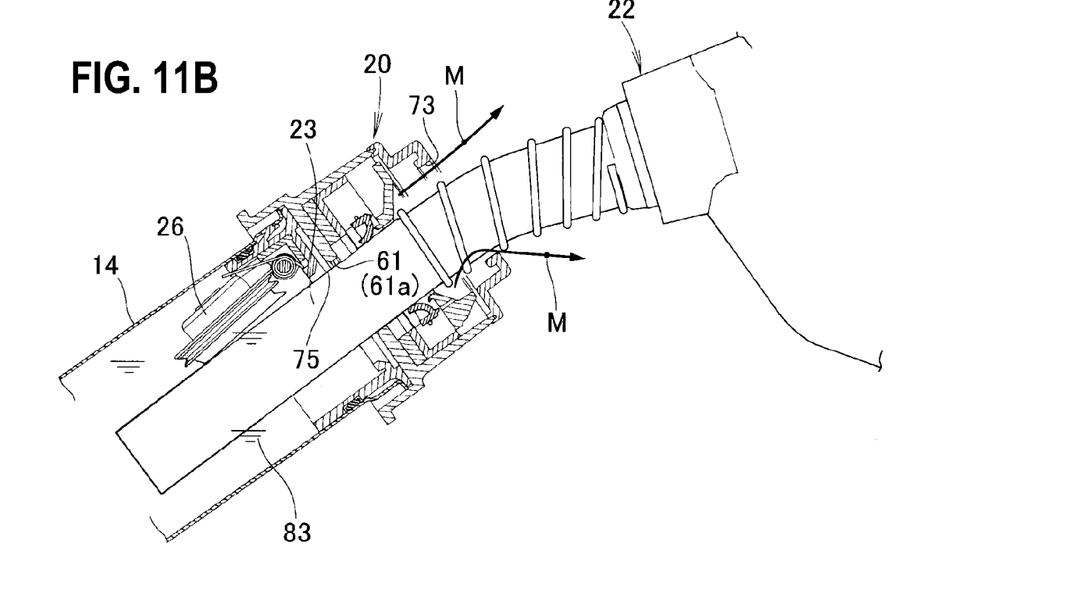
FIG. 11B is a view showing inclined surfaces formed in the internal peripheral edge of the outside cylinder partitioning opening.

FIGS. 11A and 11B show a state in which fuel slowly overflows from the fuel filler opening. The fuel filler nozzle 23 has been omitted from FIG. 11A in order to make the flow rate of fuel 83 easier to understand.

In FIG. 11A, the outside cylinder partitioning opening 61 has a plurality of partitioning concavities 76 formed in the internal peripheral parts 61b. Accordingly, the remaining fuel 83 in the fuel 83 that has flowed back from the filler pipe 14 (FIG. 10A) flows through the partitioning concavities 76 as shown by arrow J.

At this time, some of the remaining fuel 83 is blocked from flowing through by the internal peripheral parts 61b. Accordingly, some of the remaining fuel 83 circumvents the internal peripheral parts 61b and flows into the partitioning concavities 76 as shown by arrows K. The flow rate can thereby be minimized when the remaining fuel 83 flows through the partitioning concavities 76 as shown by arrows J and K.

A plurality of ring concavities 68 are formed in the ring opening 65 of the operating ring 28. By disposing the ring concavities 68 at an offset (in different positions) in the circumferential direction from the partitioning concavities 76, a labyrinth 81 is formed by the ring concavities 68 and the partitioning concavities 76. Accordingly, the fuel 83 flowing through the partitioning concavities 76 as shown by arrows J and K is blocked from flowing through by the guide pieces 64a of the insertion guides 64. The fuel 83 flowing as shown by arrows J and K thereby circumvents the guide pieces 64a and flows to the ring concavities 68 as shown by arrows L. Therefore, the flow rate can be minimized when the fuel 83 flowing as shown by arrows J and K flows through the ring concavities 68 as shown by arrows L. Thus, the flow rate of the remaining fuel 83 in the fuel 83 flowing back from the filler pipe 14 can be minimized by the labyrinth 81 being formed by the ring concavities 68 and the partitioning concavities 76.

In FIG. 11B, inclined surfaces (chamfered parts) 75 are formed in the internal peripheral edge 61a of the outside cylinder partitioning opening 61, and a labyrinth 81 (FIG. 11A is formed by the ring concavities 68 and the partitioning concavities 76, whereby the flow rate of the fuel 83 flowing back from the filler pipe 14 can be minimized. Accordingly, the fuel 83 flowing back from the filler pipe 14 can be slowly discharged from the fuel filler opening 73 to the outside of the fuel filler opening structure 20 for an automobile, as shown by arrows M. The discharged fuel 83 can thereby be prevented from coming in contact with the user.

Figure 12:
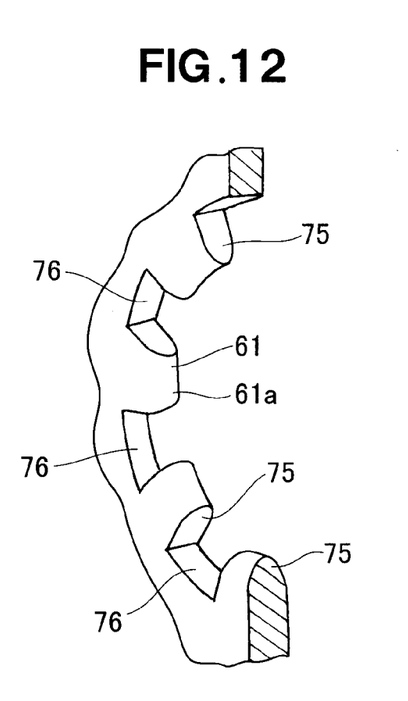
FIG. 12 is a view showing a modification of the chamfered parts in FIG. 5.

FIG. 12 shows a modification of the chamfered parts 75 shown in FIG. 5. In the example shown in FIG. 5, an example was shown of chamfered parts 75 in which the corners of the internal peripheral edge 61a forming the outside cylinder partitioning opening 61 were comprised of inclined surfaces, but the same action and effect as inclined surfaces can be exhibited even when the chamfered parts 75 are convex curved surfaces as shown in FIG. 12.

In the present example, an example was described in which the operating ring 28 was used as the first partitioning part, but the present invention is not limited to this option alone, and a new member can also be provided as the first partitioning part.

In the present example, an example was described in which a plurality of ring concavities 68 were included as the first hollow parts and a plurality of partitioning concavities 76 were included as the second hollow parts, but the present invention is not limited to this option alone, and a labyrinth can be formed by offsetting one ring concavity 68 and one partitioning concavity 76 in the circumferential direction.

Furthermore, in the present example, the ring concavities 68 and the partitioning concavities 76 (i.e., concavities) were used as examples of the first and second hollow parts, but the present invention is not limited to this option alone, and openings (holes) or other hollow parts can also be used.

Furthermore, in the present example, an example was described in which the fuel filler opening structure 20 for an automobile included a labyrinth 81, and inclined surfaces 75 were formed in the internal peripheral edge 61a of the outside cylinder partitioning opening 61, but the present invention is not limited to this option alone, and either one of the labyrinth 81 and the inclined surfaces 75 alone can be applied.

In the present example, an example applied to a so-called capless type of fuel filler opening structure 20 was described, but the present invention is not limited to this option alone, and can also be applied to a fuel filler opening structure having a fuel filler opening cap in the fuel filler opening.

Furthermore, the shapes of the filler pipe 14, the pipe shutter 26, the operating ring 28, the outside cylinder partitioning wall 52, the ring concavities 68, the partitioning concavities 76, and the other components shown in the present example are not limited to those described herein and can be suitably varied.

INDUSTRIAL APPLICABILITY

The present invention is preferably applied to an automobile provided with a fuel filler opening structure in which a shutter for opening and closing a filler pipe is provided, and the shutter is held in the open state by being pushed in by a fuel filler nozzle.

LEGEND

10 . . . automobile; 11 . . . vehicle frame; 14 . . . filler pipe; 20 . . . automobile fuel filler opening structure; 23 . . . fuel filler nozzle; 26 . . . pipe shutter; 28 . . . operating ring (first partitioning part); 52 . . . outside cylinder partitioning wall (second partitioning part); 61 . . . outside cylinder partitioning opening (a second opening, an opening); 65 . . . ring opening (first opening); 68 . . . ring concavities (first hollow parts); 73 . . . fuel filler opening; 75 . . . inclined surfaces (chamfered parts); 76 . . . partitioning concavities (second hollow parts); 81 . . . labyrinth; 83 . . . fuel; P3 . . . fuel filling position; S1 . . . space between the internal peripheral edge of the outside cylinder partitioning opening and the fuel filler nozzle (space between the opening and the fuel filler nozzle); S2 . . . space between the inclined surfaces and the fuel filler nozzle.

The invention claimed is:

1. An automobile fuel filler opening structure comprising:
a filler pipe having a fuel filler opening that allows insertion of a fuel filler nozzle therethrough; and
a shutter for opening/closing the filler pipe, the shutter being adapted to be held in an opened state by pushing in the fuel filler nozzle so as to allow insertion of the fuel filler nozzle up to a fuel filling position,
wherein the structure further comprises first and second partitioning parts provided at a predetermined interval between the shutter and the fuel filler opening for allowing passage of the fuel filler nozzle therethrough,
the first partitioning part having a first opening formed therein for allowing passage of the fuel filler nozzle,
the first partitioning part having a plurality of insertion guides provided at constant intervals in a circumferential direction of the first opening thereby defining a plurality of first hollow parts, such that each first hollow part is defined by each pair of adjacent insertion guides,
the second partitioning part having a second opening formed therein for allowing passage of the fuel filler nozzle,
the second partition part having a plurality of protrusions provided at constant intervals in a circumferential direction around the second opening thereby defining a plurality of second hollow parts, such that each second hollow part is defined by each pair of adjacent protrusions,
each of the insertion guides being elastically deformable to allow passage of the fuel filler nozzle through the first opening, and
each insertion guide being aligned circumferentially with a respective second hollow part so that the first and second hollow parts are disposed in a circumferentially offset relation to each other to thereby form a labyrinth between the shutter and the fuel filler opening,
the plurality of insertion guides being longitudinally spaced along the filler pipe away from the protrusions at such a distance as to prevent direct contact between the insertion guides and the protrusions.

2. The fuel filler opening structure of claim 1, wherein the second partitioning part has a fuel filler opening side and a shutter side and has chamfered parts formed on an internal peripheral edge of the opening on both the fuel filler opening side and the shutter side.

3. The fuel filler opening structure of claim 2, wherein the chamfered parts comprise inclined surfaces.

4. The fuel filler opening structure of claim 2, wherein the chamfered parts comprise convex curved surfaces.

5. The fuel filler opening structure of claim 1, wherein the labyrinth comprises a plurality of a non-straight line paths between the plurality of first hollow parts and the plurality of second hollow parts.

* * * * *